UNITED STATES PATENT OFFICE.

BAYARD A. BERRYMAN, OF ST. LOUIS, MISSOURI, ASSIGNOR TO HIMSELF, STILSON HUTCHINS, AND WILLIAM H. BARCLAY, OF SAME PLACE.

IMPROVEMENT IN PREPARED BRICKS FOR PAVING.

Specification forming part of Letters Patent No. 162,885, dated May 4, 1875; appl'cation filed March 24, 1875.

*To all whom it may concern:*

Be it known that I, BAYARD A. BERRYMAN, of St. Louis, in the county of St. Louis and State of Missouri, have invented a certain new and useful Material for Paving and other purposes, of which the following is a specification:

My improvement consists in a material for paving streets, &c., which is formed of bricks, indurated by first soaking in a solution of alum, borax, and copperas, and, after drying, by immersion for a number of hours in a heated mixture of caoutchouc and coal-tar.

In carrying out my invention, I take common building-bricks, made in the ordinary way and of the usual material, and burnt in the common manner. The bricks are immersed in a liquid solution, formed as follows: Alum, six pounds; borax, four pounds; copperas, (sulphate of iron,) four pounds; and water, thirty gallons. The bricks remain immersed twelve hours, more or less, according to the character of the brick. The bricks, after removal from the solution, are dried throughout, and, after becoming dry, are boiled for twelve hours, more or less, in the following mixture: Caoutchouc, two and one-half pounds, dissolved in any suitable solvent, and mixed with coal-tar, six gallons. Upon removal from this mixture, the bricks are ready for use.

In making the pavement, the bricks are set in contact, or nearly in contact, with each other, and the joints or space between them filled in with the described mixture of coal-tar and caoutchouc.

When laying the pavement on the carriage-way of streets, it is preferable to stand the bricks end upward; but when the bricks are used for sidewalks they may be laid flat, and in this position will be found, it is believed, to outlast most, if not all, varieties of stone in a similar position.

I claim as my invention—

1. A brick hardened by immersion in a solution of alum, borax, and copperas, and afterward boiled in a mixture of caoutchouc and coal-tar, substantially in the manner set forth, for paving and other purposes.

2. A pavement made of bricks prepared as described, with the spaces between the bricks filled with the mixture of coal-tar and caoutchouc, as set forth.

BAYARD A. BERRYMAN.

Witnesses:
SAML. KNIGHT,
ROBERT BURNS.